United States Patent [19]

Pacou et al.

[11] Patent Number: 5,481,870
[45] Date of Patent: Jan. 9, 1996

[54] ROCKET ENGINE NOZZLE WITH SELECTIVELY SMALLER OUTLET CROSS-SECTION

[75] Inventors: Claude Pacou, Nancay; Didier Vuillamy, Quincampoix; Etienne Tiret, La Chapelle Reanville; Pierre Desclos, Vernon; André Beaurain, Chambly, all of France

[73] Assignee: Societe Europeenne de Propulsion, Suresnes, France

[21] Appl. No.: 249,159

[22] Filed: May 25, 1994

[30] Foreign Application Priority Data

May 28, 1993 [FR] France .................. 93 06455

[51] Int. Cl.⁶ .................. F02K 1/06; F02K 9/87
[52] U.S. Cl. .................. 60/266; 60/271; 237/265.15
[58] Field of Search .................. 60/266, 271, 242, 60/250, 254; 237/265.15, 265.19, 265.33, 265.43

[56] References Cited

U.S. PATENT DOCUMENTS

| | | | |
|---|---|---|---|
| 2,880,576 | 4/1959 | Kappus | 60/271 |
| 3,224,681 | 12/1965 | Fiser et al. | 239/265.15 |
| 3,237,402 | 3/1966 | Steverding | 239/265.15 |
| 3,925,982 | 12/1975 | Mueller | 60/242 |
| 4,434,614 | 3/1984 | Gill et al. | 239/265.15 |

FOREIGN PATENT DOCUMENTS

| | | |
|---|---|---|
| 2457390 | 12/1980 | France . |
| 2503794 | 10/1982 | France . |
| 2568316 | 1/1986 | France . |
| 2618488 | 1/1989 | France . |
| 1210635 | 2/1966 | Germany . |

OTHER PUBLICATIONS

"Confined Jet Thrust Vector Control Nozzle Studies", J. H. Friddell, et al., 4549 Journal of Propulsion and Power 8(1992) Nov./Dec., No. 6, Washington, D.C. U.S. pp. 1239–1244.

Primary Examiner—Louis J. Casaregola

[57] ABSTRACT

In a rocket engine nozzle with a selectively smaller outlet cross-section, the nozzle comprising a converging portion which receives the gases produced in a combustion chamber, a nozzle throat of small cross-section and a diverging part connected to the nozzle throat and terminating at its downstream portion in a gas jet outlet cross-section defining a high cross-section ratio, a releasable annular obstacle is connected to the downstream end of the diverging part so as to define at the outlet of the diverging part a zone of selectively smaller cross-section which ensures stability of the separation of the flow of hot gases relative to the wall of the diverging part during a first phase of flight.

14 Claims, 4 Drawing Sheets

ROCKET ENGINE NOZZLE WITH SELECTIVELY SMALLER OUTLET CROSS-SECTION

FIELD OF THE INVENTION

The invention relates to rocket engine nozzles and more particularly to nozzles intended to operate in an outside environment of varying pressure, the nozzle comprising means for matching its diverging part to the varying ambient flight conditions.

PRIOR ART

The pursuit of high specific impulse, at altitude, has led to rocket engines being fitted with nozzles of large cross-section ratio. However, this technique is limited by the phenomenon of jet separation which induces unacceptable mechanical loads on the diverging part.

For a given engine, the specific impulse increases as the ambient pressure decreases, such as during the ascent of a rocket through the atmosphere, and the laws of physics show that: the operation of the nozzle is optimal at a certain altitude at which the nozzle is said to be "matched". Nozzles are generally optimized as a function of the overall performance of a stage, which in most cases produces nozzles that are overexpanded, providing thrust that is at a maximum at a relatively high altitude. The thrust is at a maximum at the matching altitude, i.e. when the static pressure Pe of the gases in the outlet section of the nozzle is equal to the ambient pressure Pa, which pressure is relatively low. For example, the matching altitude may be situated at about ten kilometers above the ground. For the entire phase of the flight from the ground up to the matching altitude, the static pressure Pe of the gases in the outlet section of the nozzle is very substantially less than the ambient pressure. In this phase, during which the nozzle is overexpanded, and particularly on starting where the ambient pressure corresponds to atmospheric pressure at ground level, a phenomenon exists whereby the jet separates from the wall of the diverging part, which limits the expansion ratio of the gases, i.e. the ratio between the pressure Po in the combustion chamber and the static pressure Pe of the gases in the outlet section of the nozzle.

In order to avoid the phenomenon of jet separation, proposals have already been made, for example in document FR-A-2503794, to use on starting and at low altitude a diverging part of smaller outlet cross-section which is installed inside a diverging part of larger outlet cross-section. When the rocket engine has reached an altitude such that the diverging part of larger outlet cross-section can operate without risk of jet separation, then the internal diverging part of smaller cross-section is separated and released.

Such a system for matching a rocket engine nozzle is not entirely satisfactory as it requires the small internal diverging part to be connected to the throat of the nozzle which is at a very high temperature, so that its implementation is relatively complex. Implementing two complete diverging parts nested like Russian dolls also tends to increase the weight of the assembly.

It has also been proposed, particularly in documents FR-A-2568316 and FR-A-2457390, to implement variable geometry nozzles comprising a first diverging part which is relatively short and of relatively small cross-section and which is used during a first phase of flight from the ground, and one or more lengths forming further diverging parts which can be connected downstream from the first diverging part to prolong it and create an outlet of larger cross-section once the rocket engine has reached a certain altitude where the ambient pressure is low. Such types of nozzle with deployable diverging parts improve the matching of the rocket engine during different phases of flight, but also increase structural complexity, cost, and on-board weight and do not always guarantee sufficient reliability of operation when account is taken of the fragility of the deployment mechanisms and of the difficulty in providing correct alignment of the different lengths of diverging part.

In addition to the problems related to the deployment system per se, the use of a deployable diverging part on a rocket engine also puts constraints on the design of the engine.

It is also known, in particular from documents U.S. Pat. No. 3,925,982 or FR-A-2618488, to use a diverging part of fixed cross-section ratio, having a relatively large outlet cross-section which optimizes operation at altitude in an environment of low outside pressure, and to use, at a predetermined distance along the outlet section, means for stabilizing the separation of the gas jet from the wall of the diverging part, on starting and during a first phase of flight at low altitude. However, until now, proposals have been to stabilize the separation of the jet essentially by injecting a ring of fluid through the wall of the diverging part. The requirement to use fluid and to control its injection within the diverging part increases the complexity of the system and tends to reduce its reliability.

OBJECTS AND BRIEF SUMMARY OF THE INVENTION

The present invention seeks to overcome the abovementioned difficulties and to allow good matching of a rocket engine nozzle to different flight conditions from the ground up to an altitude at which ambient pressure is low, without using any additional parts adjacent to the throat of the nozzle or mechanisms for deploying extension pieces for the diverging part or of fluid injection systems.

The invention seeks to give a good degree of matching ability to a rocket engine nozzle and a satisfactory overall efficiency, using static means only to overcome the problems connected with the phenomenon of jet separation.

These objects are achieved using a rocket engine nozzle with a selectively smaller outlet cross-section, the nozzle comprising a converging portion which receives the gases produced in a combustion chamber, a nozzle throat of small cross-section (So) and a diverging part connected to the nozzle throat and terminating at its downstream portion in a gas jet outlet cross-section (Se) defining a high cross-section ratio ($\epsilon$=Se/So), wherein a releasable annular obstacle is connected to the downstream end of the diverging part so as to define at the outlet of the diverging part a zone of selectively smaller cross-section (S1) which ensures stability against Jet separation during a first phase of flight.

The zone of selectively smaller cross-section (S1) may for example constitute about 55% to 85% of the outlet cross-section (Se) of the diverging part.

The releasable annular obstacle, which comprises a diaphragm, has an internal flow cross-section which may be calculated according to the following considerations:

First Consideration

The pressure Pd in the dead zone being fixed, the height h of the annular obstacle is defined as shown in FIG. 1:

the deflection φ of the jet
the profile of the nozzle
the pressure jump through the shock
the pressure and Mach field on the nozzle
the separation criterion Second Consideration The nozzle when fitted with an annular obstacle functions as a supersonic nozzle with two throats, such that the flow cross-section AD of the annular obstacle should satisfy the relation:

AD>KAC(Pi1/Pi2)MT

K: factor allowing for viscosity effects k>1
AC: area of nozzle throat
Pi1: stagnation pressure before the shock at Mach MT
Pi2: stagnation pressure after the shock at Mach MT
MT: maximum Mach number initiated in the nozzle with two throats and to which the normal shock relationship is applied in order to determine Pi1 and Pi2.

As the second consideration does not give rise to penalties in the applications envisaged, the height h of the diaphragm can be fixed in application of the first consideration.

At the altitude at which release is envisaged, it is necessary merely to verify that the ambient pressure is sufficiently low to avoid the jet separating after the annular obstacle has been released.

By adding a releasable annular obstacle, which causes selective restriction of the flow cross-section at the outlet of the diverging part, the invention allows the jet separation to be stabilized and therefore prevents the appearance of asymmetrical loads on the diverging part.

Once the rocket engine is at a sufficient altitude for separation of the jet on the nozzle without its annular obstacle to be unlikely to occur, the annular obstacle is ejected so as to allow the jet to spread out over the entire cross-section of the outlet of the diverging part. The annular obstacle can be readily ejected as it is outside the diverging part and does not come in as far as the throat of the diverging part.

In an advantageous embodiment, the annular obstacle is constituted by an axially symmetrical ring which is inclined towards the outside with respect to a plane perpendicular to the axis of the nozzle, to form with that plane an angle lying in the range of about 20° to 45°, the ring having uniform curvature.

Thus, in an advantageous embodiment, the annular obstacle is formed by an axially symmetrical surface with a uniform generatrix, which forms at the outlet of the annular obstacle an angle of about 45° relative to a plane passing through the end of the diverging part, this angle being provided so as to spread out the heat flux exchanged with the flow.

The annular obstacle is constituted by a set of angular sectors assembled to one another and provided with contact surfaces which cause them to move together.

The annular obstacle is provided with thermal protection means.

This thermal protection means may comprise an abradable material which forms at least a part of the annular obstacle, for example in the form of a coating.

Moreover, the thermal protection means may comprise means for injecting turbine gas through the wall of the diverging part downstream of the zone at which the flow of hot gases separates from the wall of the diverging part.

In this case, in a particular embodiment, the thermal protection means comprises means for injecting turbine gas through the wall of the diverging part in the vicinity both of the outlet section of the diverging part and of the zone where the annular obstacle is connected.

The thermal control means for the annular obstacle provides resistance to heat not only for the obstacle, but also for the devices which allow it to be released.

The annular obstacle includes means for selectively connecting it to the downstream end of the diverging part.

Rupture of these connecting means may be remotely controlled by pyrotechnical, pneumatic or electrical means.

In another possible embodiment, the means for connecting the annular obstacle to the downstream end of the diverging part are configured so as to break automatically after a predetermined operating time.

These automatic rupturing means may comprise elements made of an abradable composite material, for example.

In a particular embodiment, the angular sectors which are assembled to one another each include a hook in the form of a clamp intended to grip a flange formed at the downstream end of the diverging part.

In a particular embodiment, the inside end of each angular sector constituting the annular obstacle is bent back so as to define a groove in which there is engaged a cable cooperating with a tensioning and unlocking system, to keep the angular sectors assembled to each other and connected to the diverging part during said first phase of flight, and to release the angular sectors and allow them to be ejected so as to release the outlet section of the diverging part at the end of said first phase of flight.

BRIEF DESCRIPTION OF THE DRAWINGS

Other features and advantages of the invention will emerge from the following description of particular embodiments, given by way of example, and with reference to the accompanying drawings in which.

DETAILED DESCRIPTION OF PARTICULAR EMBODIMENTS OF THE INVENTION

Figure 2:
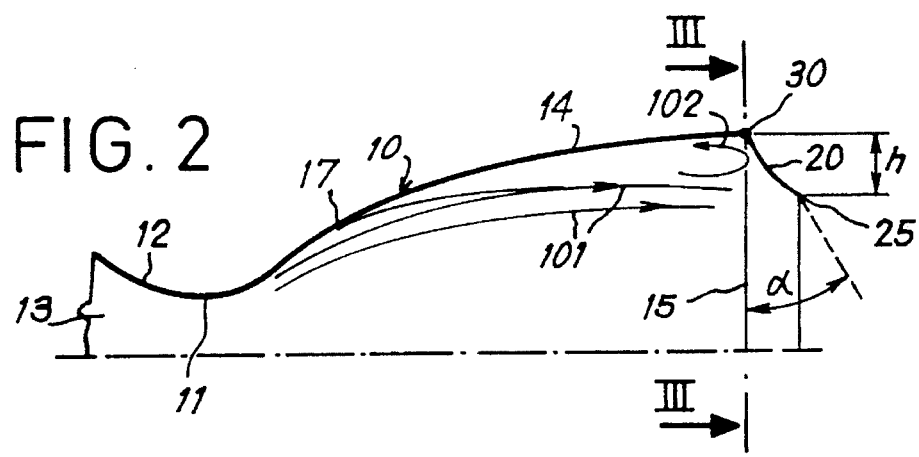
FIG. 2 is a schematic axial half-section view of a nozzle of a particular embodiment of the invention having an axially symmetrical annular obstacle, a wall of which is inclined towards the outside with respect to the outlet plane of the diverging part.

FIG. 2 shows the general shape of a nozzle 10 of a rocket engine comprising an upstream converging portion 12 which receives the hot gases produced in a combustion chamber 13, a nozzle throat 11, and a diverging part 14 which ensures the expansion of the hot gases downstream of the throat 11 and their ejection from the downstream end 15 of the diverging part which has an outlet cross-section Se.

The cross-section ratio s between the outlet cross-section Se of the diverging part and the cross-section So where the gases pass through the throat 11 of the nozzle defines an expansion factor. The expansion ratio of the nozzle 10 is in fact defined by the ratio between the pressure Po in the combustion chamber and the static pressure Pe of the gases in the outlet section of the nozzle, and the expansion ratio depends directly on the cross-section ratio $\epsilon$.

It is generally desired to have the largest possible expansion ratio, and therefore cross-section ratio $\epsilon$, so as to obtain large thrust.

However, as already indicated, thrust is maximized only if the nozzle is matched, i.e. if the static pressure Pe of the gases in the outlet section of the nozzle is equal to the pressure Pa of the ambient surroundings.

If the nozzle is matched for operation at high altitude, where the ambient pressure Pa is very low, the nozzle is overexpanded at ground level where the static pressure Pe of the gases in the outlet section of the nozzle is very much less than ambient pressure Pa which is then equal to 1 bar, and with conventional diverging parts, this gives rise to a phenomenon whereby the jet of hot gases separates from the wall of the diverging part 14. This jet separation phenomenon causes asymmetry and instability and can lead to destruction of the diverging part.

Proposals have therefore already been made to use quite complex means for stabilizing the separation of the jet with the aid of systems for injecting gas, or more generally to limit the length of the diverging part and its outlet cross-section so as to avoid the jet separation phenomenon at low altitude. This results in a loss of thrust at high altitude or in the requirement to add nozzle extension systems at high altitude which complicate the structure of the assembly considerably and thus make it fragile.

By way of example, consider a conventional nozzle of a rocket engine for the first stage of a launcher, where the cross-section ratio of the nozzle is limited to $\epsilon=45$ to guarantee that no jet separation can occur at ground level or at very low altitude. For the gases generally produced in rocket engines, this corresponds to a nozzle which is matched to an outside pressure of the order of 0.4 bar, but which is underexpanded for outside pressures of less than 0.4 bar, i.e. for altitudes above 8 to 10 km. The thrust therefore remains limited for all phases of the flight above about 10 km.

The invention offers a simple means for improving the matching of a nozzle over a more extended operating range, by stabilizing the jet separation phenomenon which occurs at low altitude whilst still making it possible to use a nozzle of geometry having a high cross-section ratio $\epsilon$, of the order of 80 to 100 for example, and therefore improved thrust at high altitudes above about 10 km, in the above-mentioned example where the ambient pressure is low.

For this purpose, an annular obstacle 20 (FIGS. 1 and 2) is attached to the downstream end 15 of the diverging part to ensure that, at low altitude, the jet of hot gases 101 separates from the wall in stable manner.

The external cross-section of the annular obstacle 20 is equal to the outlet cross-section Se of the downstream end 15 of the diverging part 14, and defines a flow zone 25 of cross-section S1 smaller than that of the outlet cross-section Se of the diverging part 14.

The zone 25 may have a small cross-section S1 which is about 15% to 45% smaller than the outlet cross-section Se of the diverging part 14.

The releasable annular obstacle 20, which constitutes a diaphragm, has an internal flow cross-section (and therefore a height h), which may be calculated from the considerations which were mentioned above in the introductory part of the description.

The obstacle 20 may have various shapes.

In the embodiment shown in FIG. 2, the annular obstacle 20 is constituted by an axially symmetrical ring. The axially symmetrical surface forming the obstacle to the flow is uniformly inclined relative to a plane perpendicular to the axis of the nozzle so as to check the thermal flows.

The transverse distance h between the inside end 25 of the annular obstacle 20 and a line which is an axial extension of the downstream end 15 of the diverging part may be of the order of 10 cm to 40 cm in the case of the previously-cited example, but this of course depends on the dimensions of the diverging part 14.

In the case of a diverging part with a diameter of about 2 meters at its outlet section, defining a cross-section ratio of about $\epsilon=80$, and in which the limiting value of $\epsilon$ for operation at ground level without separation is about 45, the zone 17 of jet separation may be situated at about 1 meter from the downstream end 15 of the diverging part 14.

In this case, an annular obstacle having a transverse height h of about 30 cm is able to ensure satisfactory stabilization of the jet separation by providing recompression of the jet of gas at the outlet of the annular obstacle 20, at a pressure of about 0.7 bar which is close to the outside pressure in the first phase of the flight.

Figure 1:
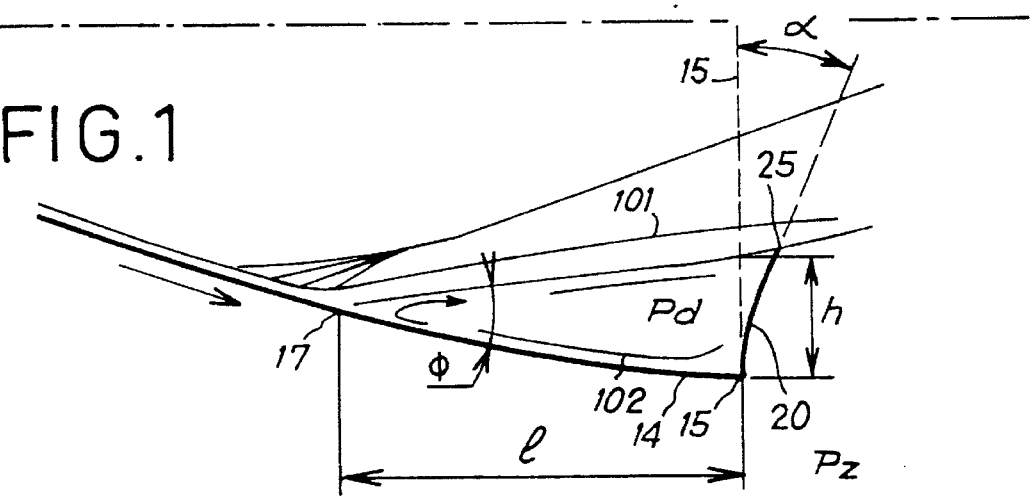
FIG. 1 is a schematic axial half-section view of a portion of a nozzle with an annular obstacle placed in the outlet plane of the diverging part, of the invention.

The flow 101 of the jet of hot gases in the diverging part 14 is represented in FIGS. 1 and 2, this jet of gases having a tendency from the outset to separate from the wall of the diverging part 14, in a zone 17 identified by an axial co-ordinate Xd, and situated at an axial distance 1 from the downstream end 15 of the diverging part, this corresponding for example to a gas pressure slightly less than 0.4 bar, taking into account the outside pressure P2 of about 1 bar which is above the conditions for non-separation of the jet. During a first time period, a dead zone 102 without flow is therefore formed downstream of the zone 17 and adjacent the wall of the downstream portion of the diverging part. The pressure of the gases at the downstream end 15 of the nozzle may for example be about 0.7 bar. The presence of the annular obstacle 20 does not prevent the jet separation phenomenon but it does allow it to be stabilized by protecting the dead zone 102 from turbulence due to the outside pressure and by ensuring recompression of the jet of hot gases at a pressure Pd. The angle of deflection $\phi$ of the jet 101 downstream of the separation zone 17 is shown in FIG. 1.

When the rocket engine is at sufficient altitude, for example about 10 km, where the outside pressure is sufficiently low to ensure that there is no risk of jet separation occurring in the diverging part 14, the annular obstacle 20 is separated from the diverging part 14 at the connecting means 30 and is ejected so that the entire outlet section Se of the downstream end 15 of the diverging part 14 is made available.

The invention therefore allows the diverging part 14 to be optimized for operation at high altitude, because of its large outlet cross-section, whilst still maintaining good efficiency during all phases of flight, with the annular obstacle 20 stabilizing the jet separation at low altitude.

It should be noted that various conventional methods exist for predicting the location at which jet separation will occur in an asymmetrical nozzle, and that the difficulty consists not in predicting the location of the separation but in controlling the separation so as to prevent the appearance of instabilities.

The methods for determining the location of the jet separation use criteria which relate the properties of the flow upstream of the separation to the characteristics of the flow downstream of the separation. A common method consists in calculating the flow through the nozzle when placed in a non-viscous fluid, to determine the characteristics of the flow adjacent the wall, and in then applying one of the separation criteria.

By way of example, if Mo represents the Mach Number of the flow before separation and P2 and P1 represent the static pressures before and after separation, the following separation criteria may be chosen:

$$\text{Zukoski criterion } \frac{P2}{P1} = 1 + \frac{Mo}{2}$$

$$\text{Summerfield criterion } \frac{P1}{P2} = (1.88Mo - 1)^{-0.64}$$

The static pressure P2 downstream of the separation may be taken as equal to the outside pressure.

To a first approximation, the Mach number Mo may be chosen to be equal to 3.

$$\text{We therefore have the condition } \frac{P1}{P2} \approx 0.4$$

Adjacent the ground, where the outside pressure P2 is about 1 bar, separation therefore occurs when the static pressure P1 of the flow of the ejected gas reaches or goes below about 0.4 bar.

Figure 9:
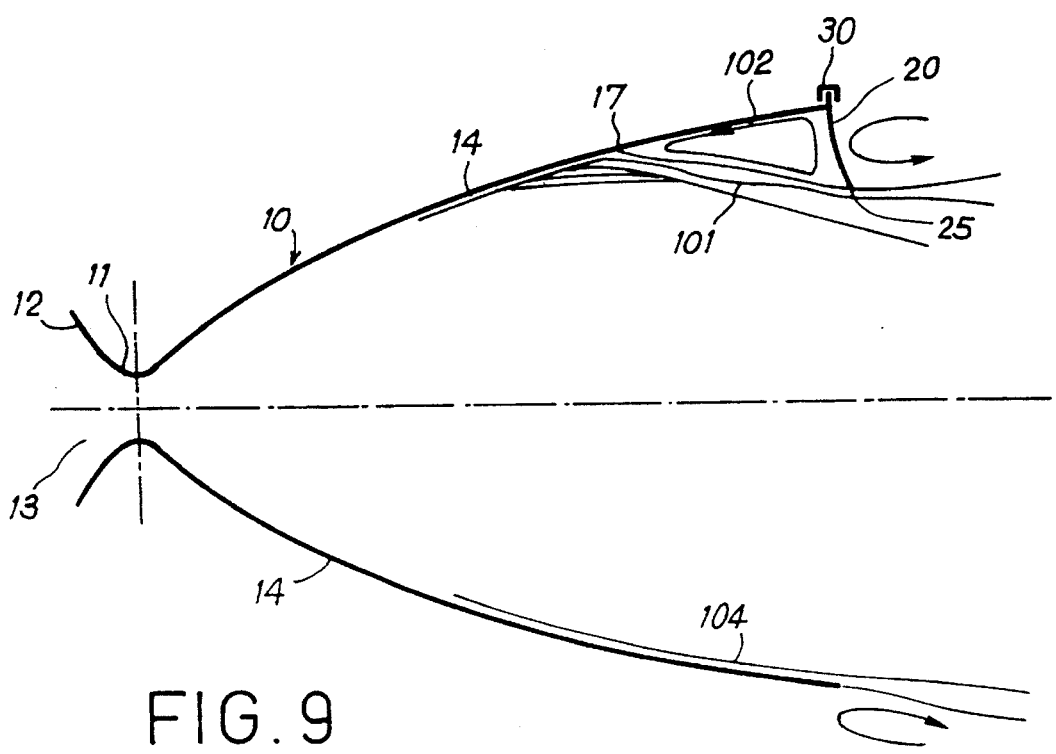
FIG. 9 is a schematic axial section of a nozzle of the invention having an upper half-section corresponding to a geometry of an annular obstacle before its release, and a lower half-section corresponding to a geometry of the annular obstacle after its release.

A nozzle of the invention has two levels of matching, one at low altitude in the presence of an annular obstacle, and the other at high altitude after ejection of the annular obstacle, due to a diverging part of large outlet cross-section. FIG. 9 shows the two possible configurations of the nozzle of the invention, the upper half-section showing the configuration at low altitude, with an annular obstacle 20 disposed at the downstream end of the diverging part, and the lower half-section showing the configuration at high altitude, after the annular obstacle 20 has been released, in which can be seen the re-appearance of a boundary layer 104 which is not separated from the wall of the diverging part.

Dual matching of the nozzle is therefore made possible simply by adding a static element, namely, the annular obstacle 20, during the first phase of flight.

This technique has the advantage that different existing diverging parts may be used and that these may be matched to different types of launch by adding annular obstacles with different characteristics.

The presence of an annular obstacle in the outlet of the diverging part in the first phase of flight also allows the diverging part to be made rigid and assists it in supporting the forces due to outside pressure. Moreover, releasing the annular obstacle 20 will not damage the diverging part 14, since this obstacle is always situated in the outlet of the diverging part.

Figure 3:
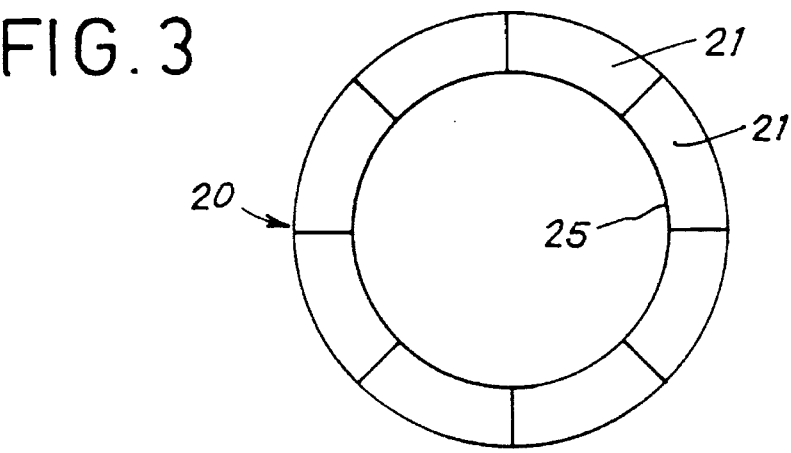
FIG. 3 is a section view along the line III—III of FIG. 2, showing an annular obstacle in several portions.
Figure 4:
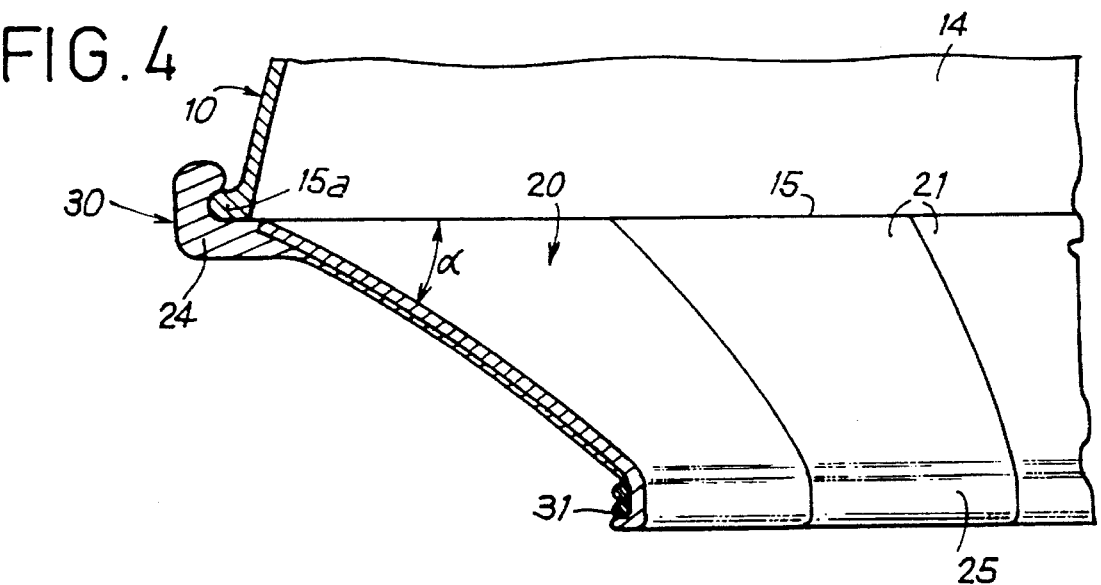
FIG. 4 is an axial section showing a portion of a connection system between an annular obstacle and the downstream portion of the diverging part of a nozzle of the invention.
Figure 7:
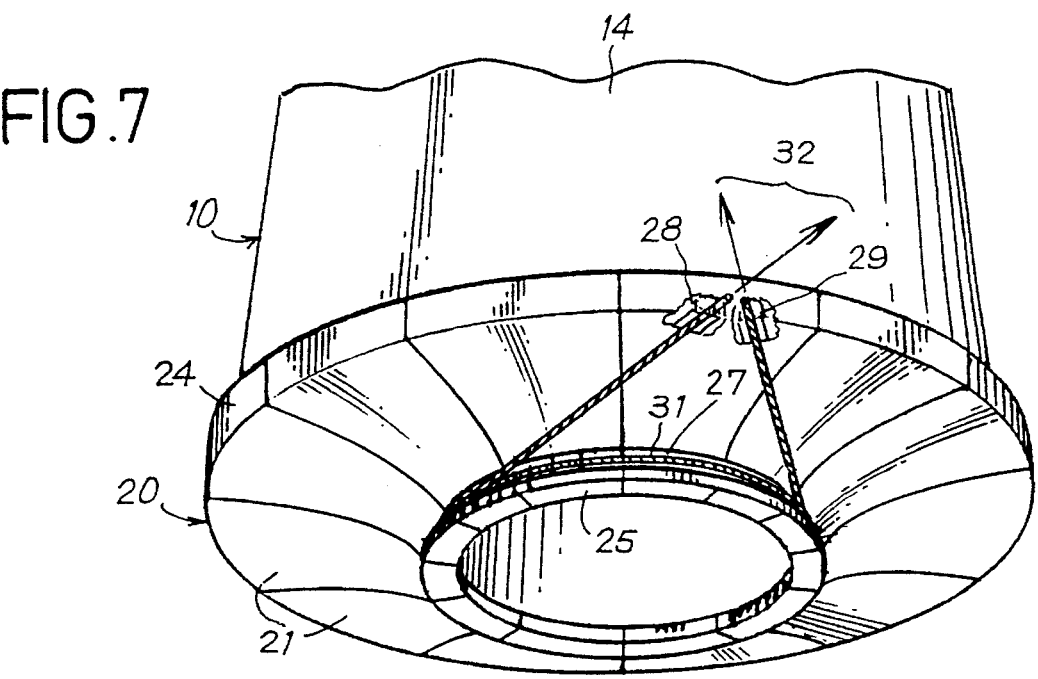
FIG. 7 is a perspective view showing the example of the connection system of FIG. 4 applied to an annular obstacle constituted by a plurality of elements.

As shown in FIGS. 3, 4 and 7, the annular obstacle in the form of an axially symmetrical annulus may comprise a plurality of elements, such as the lengths 21 to 24, thus facilitating its manufacture.

FIGS. 4 and 7 show a particular example of the connection 30 between an annular obstacle 20, represented as an axially symmetrical annulus, and the downstream end 15 of a diverging part 14. Advantageously, the annular obstacle is curved in shape with a uniform curvature, and may subtend an angle a lying in the range 20° to 45° with respect to a plane passing through the end of and perpendicular to the axis of the diverging part. The uniform curvature of the annular obstacle 20 allows the thermal flux exchanged with the flow to be spread out.

The annular obstacle 20 is provided with thermal protection or cooling means.

The type of thermal control means depends on the facilities of the engine system and may be constituted by known means.

In a particular embodiment, the annular obstacle 20 is constituted using an abradable material. This abradable material may be a mere coating or it may constitute the entirety of the annular obstacle 20.

Preferably, the thermal control means for the annular obstacle provide resistance to heat not only of the annular obstacle but also of the devices 30 which cause it to be released.

Figure 8A:
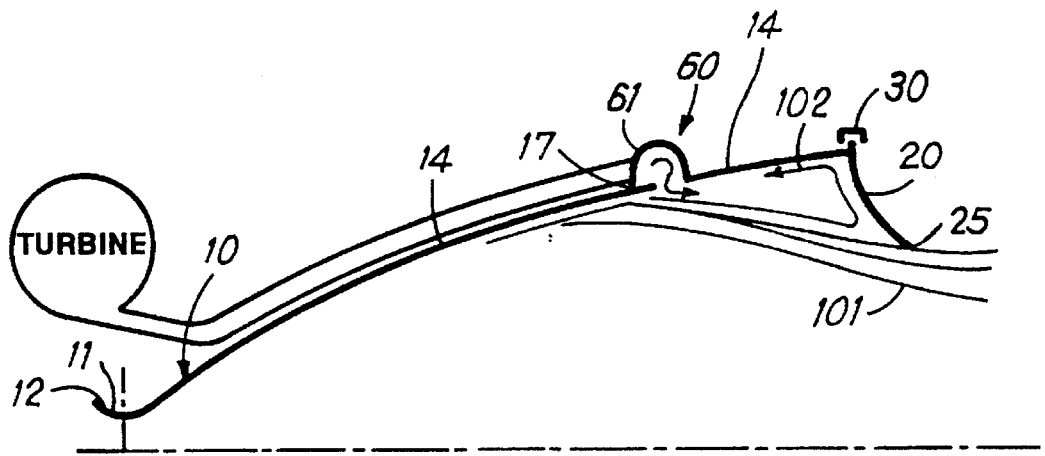
FIGS. 8A and 8B are schematic axial half-section views of a nozzle of the invention equipped with an annular obstacle and a cooling means therefor.
Figure 8B:
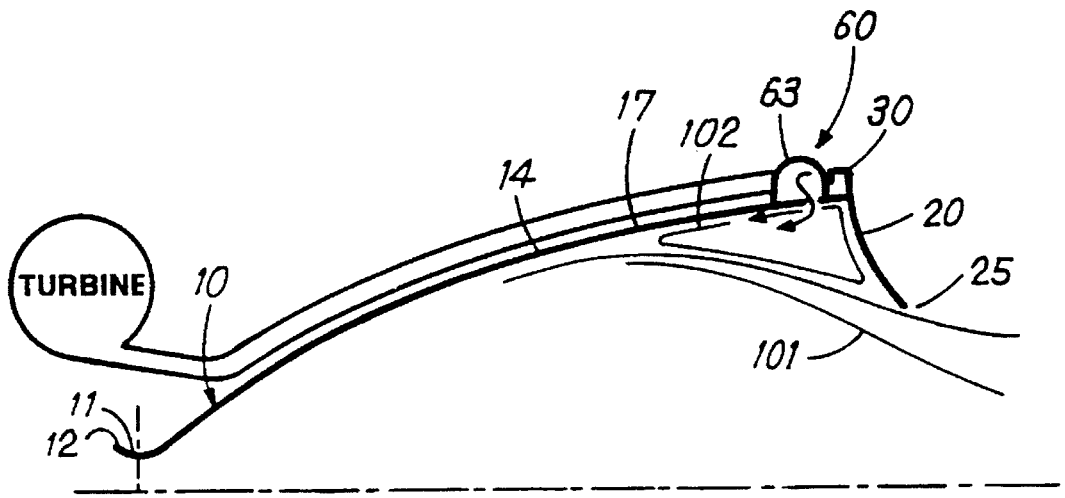

FIGS. 8A and 8B show different particular thermal protection means 60 by introducing a film of gas intended to protect both the annular obstacle 20 and the connecting means 30 which allow the annular obstacle 20 to be ejected.

In FIG. 8A, the means 60 for injecting a film of gas comprises a torus 61 which is situated around the diverging part 14 downstream of the separation zone 17 and which allows a film of turbine gas to be injected through the wall of the diverging part 14 towards the annular obstacle 20 and the connecting means 30.

In FIG. 8B, the means 60 for injecting a film of gas comprise a body 63 which is situated adjacent the downstream end 15 of the diverging part 14 and which allows a film of turbine gas to be injected through the wall of the diverging part 14 as close as possible to the annular obstacle 20 and the connecting means 30.

Generally, the connecting means 30 are designed to be broken after a predetermined time of operation when the rocket engine has reached sufficient altitude for the outside pressure to be small. Once the connecting means 30 have ruptured, the annulus 20 is separated from the diverging part 14 and ejected.

Rupture of the connecting means 30 can be effected by remote control using pyrotechnical, pneumatic or electrical means. For example, it is possible to use a pyrotechnical fuse or explosive bolts.

Rupture of the connecting means 30 may also be activated automatically after a predetermined time, of the order of several tens of seconds, for example, by using a locking element which may for example be in the form of an abradable composite material. The control of the rupture of the connecting means 30 may therefore be of the active type or of the passive type.

In the example embodiment of the connecting means 30, as given in FIGS. 4 to 7, the downstream end 15 of the diverging part 14 can be seen to be provided with a flange 15a whereas the outside end 24 of the annulus 20, which is constituted by a set of angular sectors 21, grips the flange 15a in the form of a clamp.

Figure 5:
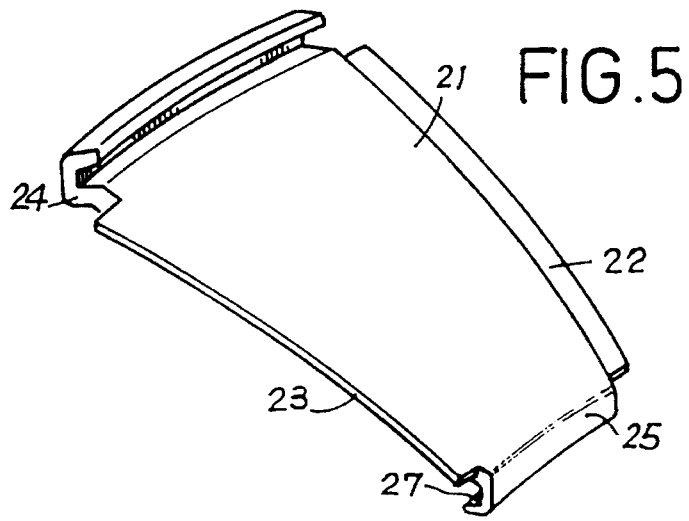
FIG. 5 is a perspective view of an example of an angular sector constituting a portion of the annular obstacle shown in FIG. 4.

Each angular sector 21 may comprise an outside portion 24 in the form of a hook intended to engage around the flange 15a formed at the downstream end 15 of the diverging part 14 (FIGS. 4 and 5).

Figure 6:
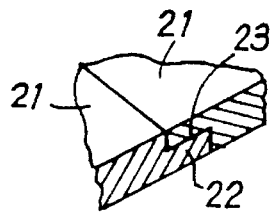
FIG. 6 is a detailed view showing an example of the assembly of the angular sectors constituting an annular obstacle.

The angular sectors 21 may have lateral ends 22, 23 shaped so as to allow assemblies of the mortice-and-tenon type (FIGS. 5 and 6).

Advantageously however, this assembly may be constituted merely by connecting together two protruding tongues 22, 23 at staggered levels which overlap, so as to allow the different angular sectors to be more readily separated when they are detached form the diverging part once a predetermined altitude has been reached. The inside end 25 of each angular sector may be curved towards the outside to define a groove 27 in which there is engaged a cable 31 which co-operates with a tensioning and unlocking system 32. The cable 31 is intended, during the initial phase of flight, to keep the angular sectors 21 assembled together, and thus connected to the diverging part 14, via their hooks 24. The cable 31 may pass through guiding and tensioning members 28, 29 which are formed on one of the angular sectors or on the diverging part 14 and which co-operate with a device 32 which controls the rupture of these guiding and tensioning members 28, 29, the device 32 being intended to control the release of the connecting means 30 constituted by the hooks 24 and by the means 25, 27, 31 for retaining the angular sectors 21.

When the tensioning and unlocking control means 32 have caused the cable 31 to be released from the guiding and tensioning members 28, 29, the angular sectors 21 are no longer maintained in the assembled position and can disconnect themselves from the flange 15a so as to be ejected, thereby completely disengaging the outlet section of the diverging part.

We claim:

1. A rocket engine nozzle for a launcher, the nozzle comprising a converging portion which receives the gases produced in a combustion chamber, a nozzle throat of small cross-section and a diverging part connected to the nozzle throat and terminating at its downstream portion in a gas outlet cross-section defining a cross-section ratio equal to or higher than 45, wherein an external releasable annular obstacle is connected externally to the downstream end of the diverging part so as to define at the outlet of the diverging part a zone of smaller cross-section than the total outlet cross-section of the diverging part to ensure stability of the separation of the flow of hot gases relative to the wall of the diverging part during a first phase of flight.

2. A nozzle according to claim 1, wherein the zone of smaller cross-section may constitute about 55% to 85% of the outlet cross-section of the diverging part.

3. A nozzle according to claim 1, wherein the annular obstacle is constituted by an axially symmetrical ring which is inclined towards the outside relative to a plane perpendicular to the axis of the nozzle, to form with that plane an angle lying in the range of about 20° to 45°, the ring having a uniform curvature.

4. A nozzle according to claim 1, wherein the annular obstacle is constituted by a set of angular sectors assembled to one another and provided with contact surfaces which cause them to move in unison.

5. A nozzle according to claim 1, wherein the annular obstacle is provided with thermal protection means.

6. A nozzle according to claim 1, wherein the annular obstacle includes means for selectively connecting it to the downstream end of the diverging part and wherein the rupture of these connecting means is remotely controlled.

7. A nozzle according to claim 1, wherein the means for connecting the annular obstacle to the downstream end of the diverging part are configured so as to break automatically after a predetermined operating time.

8. A nozzle according to claim 4, wherein the angular sectors assembled to one another each include a hook in the form of a clamp intended to grip a flange formed at the downstream end of the diverging part.

9. A nozzle according to claim 4, wherein the angular sectors are assembled to one another by overlapping joints.

10. A nozzle according to claim 4, wherein the inside end of each of the angular sectors constituting the annular obstacle is curved back so as to define a groove in which there is engaged a cable co-operating with a tensioning and unlocking system to maintain the angular sectors assembled to each other and connected to the diverging part during said first phase of flight, and to release the angular sectors and allow them to be ejected so as to release the outlet section of the diverging part at the end of said first phase of flight.

11. A nozzle according to claim 5, wherein said launcher further comprises a turbine and wherein the thermal protection means comprises means for injecting turbine gas from said turbine through the wall of the diverging part downstream of the zone at which the flow of hot gases separates from the wall of the diverging part.

12. A nozzle according to claim 5, wherein said launcher further comprises a turbine and wherein the thermal protection means comprises means for injecting turbine gas from said turbine through the wall of the diverging part in the vicinity both of the outlet section of the diverging part and of the zone where the annular obstacle is connected.

13. A nozzle according to claim 5, wherein the thermal protection means comprises an abradable material which forms at least part of the annular obstacle.

14. A nozzle according to claim 1, wherein the annular obstacle is constituted by an abradable material.

* * * * *

UNITED STATES PATENT AND TRADEMARK OFFICE
CERTIFICATE OF CORRECTION

PATENT NO. : 5,481,870
DATED : January 9, 1996
INVENTOR(S) : Claude Pacou et al

It is certified that error appears in the above-indentified patent and that said Letters Patent is hereby corrected as shown below:

Column 5, line 10, "cross-section ratio s" should read --cross-section ratio $\varepsilon$--.

Column 8, line 19, "angle a" should read --angle $\alpha$--.

Signed and Sealed this

First Day of October, 1996

Attest:

BRUCE LEHMAN

Attesting Officer

Commissioner of Patents and Trademarks